Figure 1:
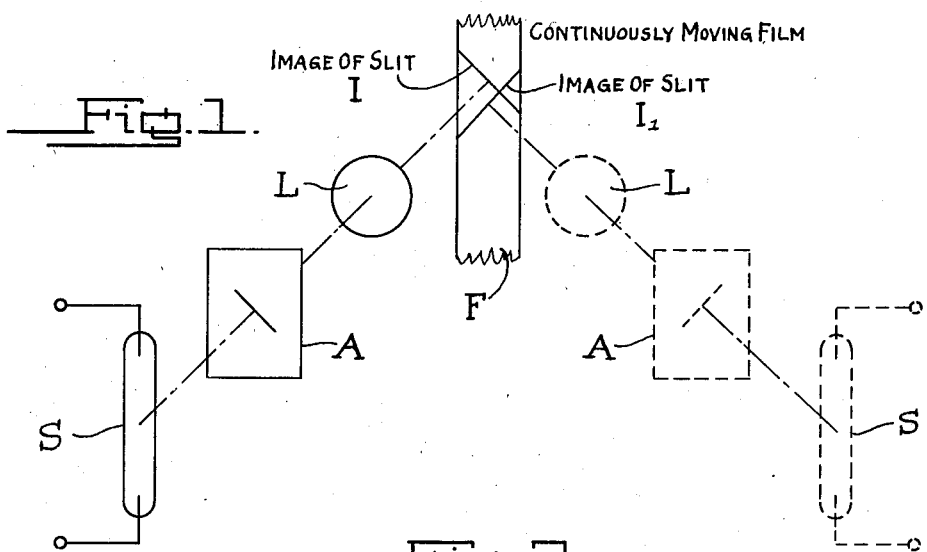

July 2, 1940.  V. B. SEASE  2,206,054

METHOD OF FORMING COLOR SCREENS

Filed Jan. 25, 1939

ARRANGEMENT FOR BROAD FILMS

INVENTOR.
Virgil Bernard Sease.

BY Lynn B. Morris
ATTORNEY

Patented July 2, 1940

2,206,054

UNITED STATES PATENT OFFICE 2,206,054

METHOD OF FORMING COLOR SCREENS

Virgil B. Sease, New Brunswick, N. J., assignor to Du Pont Film Manufacturing Corporation, New York, N. Y., a corporation of Delaware Application January 25, 1939, Serial No. 252,837

4 Claims. (Cl. 95—2)

This invention relates to color photography. More particularly it relates to a method of preparing color screens. Still more particularly it relates to a process of preparing a precision color screen for use in three color photography.

The use of color line-screens in additive color processes is well known and line screen patterns have been applied to transparent bases for sensitized photographic emulsions in a variety of cumbersome and expensive methods. One method involves an elaborate apparatus for inscribing and reinscribing successive series of intersecting parallel lines on a resist-coated film base, each series of lines being separately dyed to produce the required color mosaic. The mechanical ruling apparatus required in these methods is obviously restricted in scope and can produce only a limited number of parallel lines per inch. Other prior art methods involve the use of light templates for exposing various patterns on a sensitized base, but these methods are also restricted by the mechanical accuracy of the template itself.

A principal object of the present invention is to provide a sensitized film for color photography containing a color-screen of improved precision. A further object is to provide such a screen having a pattern of greatly reduced color element size for improving definition and color rendition and for substantially eliminating the visibility of the pattern upon the projection of the image. Another object is to provide an improved method for applying color screens to supports for use principally in color photography. Additional objects will more plainly appear from the detailed specification and description hereinafter set forth.

The above and other objects are accomplished by the following invention, which comprises continuously moving a photosensitized film element at a uniform rate of speed past a beam of light which is substantially constant in intensity during flashes. The film is maintained under light excluding conditions so that the beam of light is the sole source of exposure. The beam of light is relatively narrow in cross-section of preferably such a width that it covers the entire width of the film element. The beam is obtained by transmitting light through a narrow slit which may be in close proximity to the film element or spaced therefrom a substantial distance. In the latter instance, an optical system is placed between the slit and the film, which brings an image of the slit to focus on the sensitized surface of the film element. The beam, as stated above, is intermittent and alternates at a uniform high frequency.

After exposure, the film containing exposed lines is developed and colored and contains a series of uniformly spaced colored narrow lines and unexposed lines of sensitive coating material. The film element is then re-exposed in a similar manner, the beam, however, being turned at a different angle, and developed and colored a different color which produces a set of minute, broken, colored areas of similar shapes. The film is then given an overall flash to expose the remaining spaces and developed and colored a third color. Resensitization between exposures may be employed, if necessary.

The resulting screen consists of minute parallelograms, the adjacent ones of which are different in color. Thus, when the elements are colored red, blue and green, a precision three color screen having great utility in 3-color photography is easily prepared.

As examples of intermittent light sources of uniform high frequency alternations, the well-known systems of light modulation or interruption as used in sound recording on photo-sensitive films are typical. In general, these systems fall into two classes, those in which the light intensity remains constant and the exposure on the film is varied by means of shutter devices actuated proportionally to sound energies, and second, those in which the shutter remains of constant opening and the intermittency or alternation of light varies according to electrical translations of sound energies. By varying the conditions of speed of travel of the film and modulation or intermittency of the exposure, it is possible to produce a precise series of uniformly spaced parallel line exposures upon a sensitive surface.

In the preferred embodiment of the invention the objects are accomplished by the use of a power stroboscope which is capable of providing uniform flashes of illumination at a high frequency, e. g., from 1000 to 10,000 flashes of illumination per second. The light is transmitted as described above through a single slit or aperture onto the sensitized surface of the continuously moving film element. This slit is preferred to be of sufficient width to project an image onto a film at an angle of approximately 45° to the margin of the film, each slit or line image thereon having a width of approximately .001 inch. The continuously moving film is preferred to have a rate of travel of approximately 28 feet per minute so that it will receive intermittent flashes of light at the rate of 2,000 per second. This will produce one exposure per .0028 inch of linear travel of the film and thus result in exposed line image areas of approximately .001 inch in width.

The invention will be more fully understood by a consideration of the accompanying drawing and following description.

Figure 2:
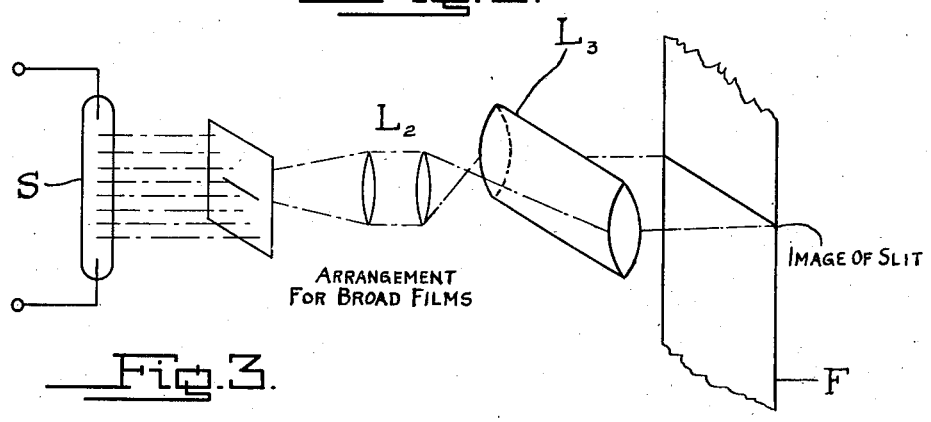
Figure 3:
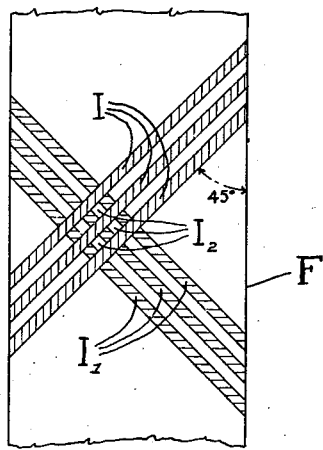

In the drawing:

Fig. 1 is a schematic drawing of a preferred apparatus showing the slit disposed at one angle in solid lines and an another angle in dotted lines, Fig. 2 is a schematic drawing of a modified apparatus for broad film elements, and Fig. 3 is a plan view upon an enlarged scale of a section of finished film.

Similar reference characters refer to similar parts throughout the several figures. S represents a high frequency alternating light source, e. g., a power stroboscope tube, A represents a single accurately formed slit or aperture, F represents a radiation sensitized continuous element such as a photosensitized film, L represents a lens for focusthe image I of the slit S on the film F. The lens may be omitted if desired, but constitutes a preferred embodiment of the invention since it aids in obtaining very narrow exposed lines. Furthermore, the slit may be placed an appreciable distance away from the moving film. However, good results may be obtained if the slit is placed in close proximity to the film. $A_1$ represents the slit in a different angular position whereby an image $I_1$ may be formed.

In Fig. 2, $L_2$ represents a projection lens system and $L_3$ a cylindrical lens for focusing narrow lines upon a broad photographic or film element.

By employing an apparatus similar to that described above, five hundred and many more accurately spaced lines per inch may be obtained. The spaces between these lines afford an additional five hundred or more lines per inch available for the present invention, thereby affording a total of one thousand or more lines per inch in one exposure.

In carrying out a preferred form of my invention, a silver halide emulsion of high contrast characteristics is coated onto a flexible film base. The sensitized film is then moved by an exposing slit, illuminated by a modulated or intermittent light source having the above-described characteristics. The slit is set at some angle greater or less than 90°, preferably about 45°, to the longitudinal side of the film. After exposure, the film is developed in a red color-forming developer and washed. An example of such a developer is as follows:

| | |
|---|---|
| Potassium carbonate_____grams__ | 40 |
| Sodium sulfite_____do_____ | 5 |
| p-Amino-dimethylaniline hydrochloride _____do_____ | 3 |
| Water to_____liter__ | 1 |

To which is added a solution of:

| | |
|---|---|
| Nitro-benzyl cyanide_____grams__ | 3 |
| Aceto-acet-p-aminophenylmorpholine _____do_____ | 3 |
| Acetone _____cc.__ | 50 |

After development the film contains a series of uniformly spaced uniform diagonal lines, comprising red dye and metallic silver, and unexposed silver salt between these lines. Preferably after drying, the film is again exposed to the modulated or intermittent light source, this time with a series of exposed line areas extending at right angles to the first set. To accomplish this, the exposing slit may be turned at right angles to its former position. After the second exposure, the film is developed in a blue color-forming developer, an example of which is as follows:

| | |
|---|---|
| Potassium carbonate_____grams__ | 40 |
| Sodium sulfite_____do_____ | 5 |
| p-Amino-diethylaniline hydrochloride _____do_____ | 3 |
| Water to_____liter__ | 1 |

To which is added the following solution:

| | |
|---|---|
| Alpha-naphthol _____grams__ | 3 |
| Acetone _____cc.__ | 25 |

The film now contains a series of diagonal lines comprising red dye and metallic silver, a second series of uniformly spaced broken diagonal lines at right angles to the first, the second series comprising blue dye and metallic silver, and in between the lines, areas of unexposed silver salt.

The film, preferably after washing and drying, is given a general, over-all exposure, and then developed in a green color-forming developer, a suitable formula for which is as follows:

| | |
|---|---|
| Potassium carbonate_____grams__ | 40 |
| Sodium sulfite_____do_____ | 5 |
| p - Aminodiethylaniline hydrochloride _____do_____ | 3 |
| Water to_____liter__ | 1 |

To which is added the following solution:

| | |
|---|---|
| 2:3:4-trichlor-alpha naphthol_____grams__ | 2 |
| Aceto-acet-p-aminophenyl morpholine _____do_____ | 2 |
| Acetone _____cc.__ | 25 |

After washing, the metallic silver images are removed by treatment with potassum ferricyanide and sodium thiosulfate, either in combination in solution, or as separate solutions. This bleachbath process is the well-known Farmer's Reducer.

After removal of the silver images, which process uncovers the dye images, the film will be covered by a screen comprising diagonal lines of red color, broken diagonal lines of blue color with rectangular green areas between the lines.

It is understood that, if preferred, the second set of lines may be color developed green and the remaining areas between the lines may be color developed blue. It is also understood that the ratio of aggregate areas of the lines and rectangular areas, may be varied by exposure conditions, for instance by varying the speed of the film and/or the duration of the exposure and/or the width of the beam, so as to obtain the correct distribution of a color-screening effect.

After completing the formation of the linescreen, it may be protected by a suitable, waterproof varnish, over which is coated a photo-sensitive emulsion.

It will be apparent from the above that various other forms of color processing may be used to obtain the results necessary to carry out this invention, such as toning, dye-toning, mordanting and dyeing, differential hardening and differential dyeing, etc.

It is to be distinctly understood, however, that color-forming development is the preferred method of coloring the exposed lines. In place of the above color-developer solutions may be substituted a wide variety of others. The particular color former chosen depends upon the specific developing agent used and the color desired. A number of representative color-formers and developing agents which are suitable for carrying out this invention and which may be substituted for those described in the specific examples are disclosed in British Patent 15,055 of 1912, British Patent 2,562 of 1913, U. S. Patent 1,102,028, Fisher & Siegrist Phot. Korr., vol. 51, page 16, (1914), and Tull, Br. Jour. Photo, October 14, 1938, pp. 647, 648.

It is also apparent that the present invention may be employed to produce a two-color line-screen comprising parallel angular lines of two colors from one exposure; a two-color line-screen with two sets of angular crossing parallel lines from two exposures; a three-color line-screen with two sets of angular crossing parallel lines with their interstices converted to color from two exposures; and a fourth color line-screen from three line exposures.

It is also obvious where silver halide sensitizers are used so-called re-sensitizing baths may be employed before re-exposure to increase the sensitivity of the silver halide as it is well-known in the prior art. Also other sensitizers may be employed such as the well-known bichromate, iron salts, diazo compounds and others well-known to workers in color photography.

While the foregoing specification presents a preferred embodiment of this invention, it is intended to include various modifications thereof within the spirit and scope of the appended claims.

This application is a continuation-in-part of my copending application, Serial No. 114,711, filed December 7, 1936.

I claim:

1. The method of forming a color screen which comprises continuously moving a photosensitized film element at a uniform rate of speed under light excluding conditions past the axis of an intermittent beam of light of substantially constant intensity, said beam being of relatively narrow cross section and disposed at an angle to the path of travel of the film element, said intermittent beam alternating at a uniform high frequency to expose portions of said film, developing and coloring the exposed lines one color; re-exposing said film element in a similar manner at a different angle, developing and coloring the thereby exposed lines a second color, exposing the remaining portions of the film element and developing and coloring them a third color.

2. A method as set forth in claim 1, wherein the first color is red, the second blue, and the third, green.

3. The method of forming a color screen which comprises continuously moving a photosensitized film element at a uniform rate of speed under light excluding conditions past the axis of an intermittent beam of light of substantially constant intensity, said beam being of relatively narrow cross section and disposed at an angle to the path of travel of the film element, said intermittent beam alternating at a uniform high frequency to expose portions of said film, simultaneously developing and coloring the exposed lines one color; re-exposing said film element in a similar manner at a different angle, simultaneously developing and coloring the thereby exposed lines a second color, exposing the remaining portions of the film element and simultaneously developing and coloring them a third color.

4. In a method of forming a color screen the steps which comprise continuously moving a photosensitized film element at a uniform rate of speed under light excluding conditions past the axis of an intermittent beam of light of substantially constant intensity, said beam being of relatively narrow cross section and disposed at a decided angle to the path of travel of the film element, said intermittent beam alternating at a uniform high frequency to expose lined portions of said film, color developing the exposed lines one color; re-exposing the film element at an opposite angle in a similar manner, and color developing the thereby exposed lines a second color.

VIRGIL B. SEASE.